United States Patent [19]

Fitzpatrick et al.

[11] 4,093,273
[45] June 6, 1978

[54] INDEPENDENT SUSPENSION SYSTEM

[75] Inventors: John D. Fitzpatrick, Utica; Gary L. Smith, Pontiac, both of Mich.

[73] Assignee: General Motors Corporation, Detroit, Mich.

[21] Appl. No.: 745,215

[22] Filed: Nov. 26, 1976

[51] Int. Cl.² ............................................. B60G 3/14
[52] U.S. Cl. ................................. 280/696; 267/63 R
[58] Field of Search ............... 280/690, 691, 696, 666, 280/668, 670; 267/63 R

[56] References Cited

U.S. PATENT DOCUMENTS

| | | | |
|---|---|---|---|
| 2,305,802 | 12/1942 | Balz | 280/666 |
| 3,201,142 | 8/1965 | Dangauthier | 280/696 |
| 3,508,745 | 4/1970 | Deane | 267/63 R X |
| 3,804,433 | 4/1974 | Scherenberg | 280/696 |

*Primary Examiner*—Philip Goodman
*Attorney, Agent, or Firm*—John P. Moran

[57] ABSTRACT

An independently sprung front wheel assembly including a frame, a steering knuckle and associated wheel, a control arm pivotally connected at its inner ends via a shaft and surrounding clamp members to the frame and its outer end to the steering knuckle, a coil spring mounted between the control arm and the frame, and an elastomeric bushing mounted around the shaft within each clamp and having vertically oriented sides of reduced effective thickness for providing a low horizontal rate and high vertical rate for increased horizontal movement and minimal vertical movement of the wheel and control arm relative to the frame during road impact conditions to substantially isolate the frame from such impacts.

4 Claims, 4 Drawing Figures

U.S. Patent June 6, 1978 4,093,273
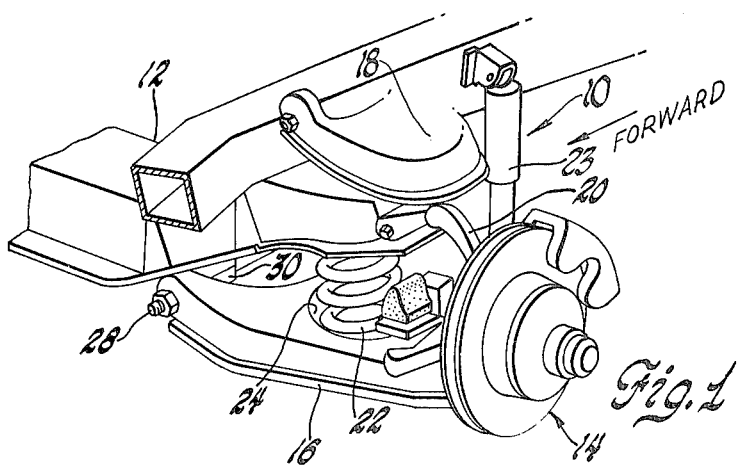
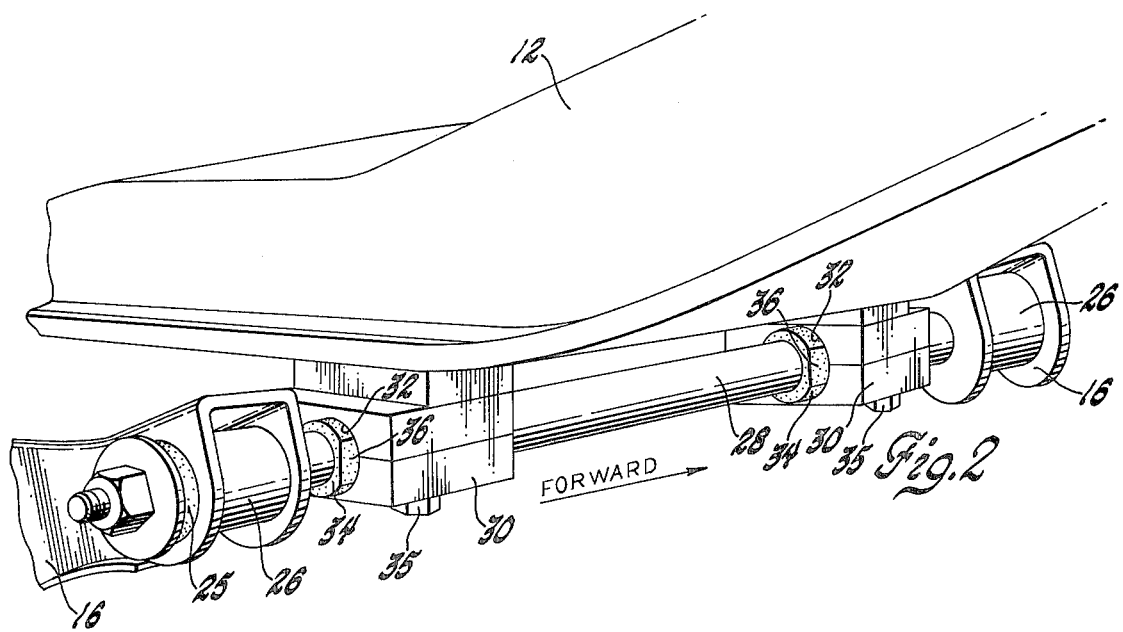
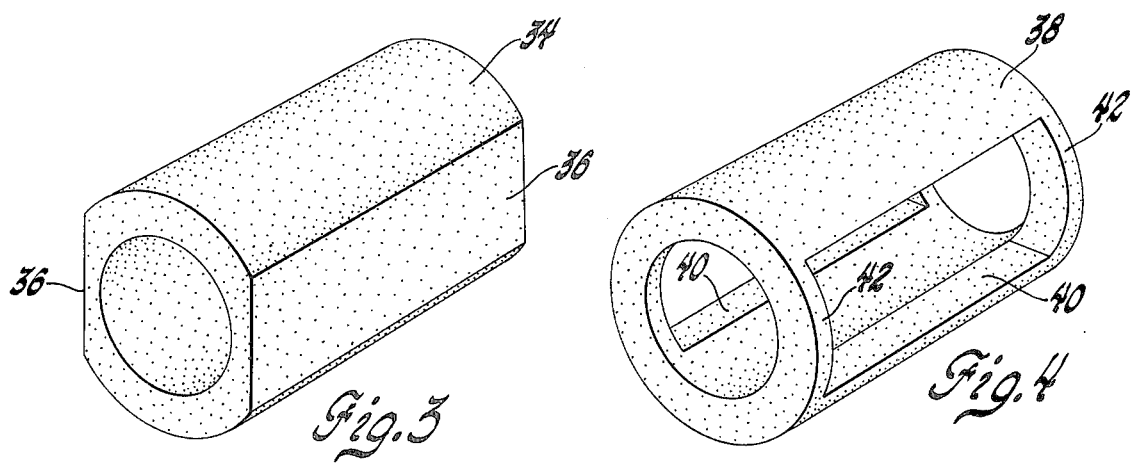

INDEPENDENT SUSPENSION SYSTEM

This invention relates generally to independent front suspension systems and, more particularly, to an improved arrangement for mounting a lower control arm to a vehicular frame.

Heretofore, it has been customary to rigidly connect the control arm shaft of a lower control arm of the type normally used on recreational and/or light duty truck vehicles to the frame side rails. In order to provide improved riding characteristics for such vehicles, various complicated and costly arrangements have been used, such as the addition of resiliently mounted subframes.

Accordingly, an object of the invention is to provide an improved, simplified, economical, and efficient elastomeric isolation means for use with the lower control arm shaft of an independent front wheel suspension system to improve the riding characteristics of the vehicle involved.

Another object of the invention is to provide a mounting arrangement for a front suspension system, including particularly shaped elastomeric bushings for use in conjunction with the clamp means securing a lower control arm shaft to a vehicular frame for improved riding characteristics.

A further object of the invention is to provide a mounting arrangement for a front suspension system, including elastomeric bushings having vertically oriented sides of reduced effective thickness for use in conjunction with the clamps securing a lower control arm shaft to a vehicular frame to provide a low horizontal rate for improving the ride during road impact conditions.

Still another object of the invention is to provide an independently sprung front wheel assembly including a frame, a steering knuckle and associated road wheel, a control arm pivotally connected at its inner ends via a shaft and intermediate clamps to the frame and at its outer end to the steering knuckle, a coil spring mounted between the control arm and the frame, and an elastomeric bushing mounted around the shaft within each clamp and having either oppositely disposed flat vertically oriented sides or oppositely disposed window portions formed in the sides thereof for providing a low horizontal rate and high vertical rate for increased horizontal movement and minimal vertical movement of the wheel and control arm relative to the frame during road impact conditions to substantially isolate the frame from such impacts.

Other objects and advantages of this invention will be more apparent when reference is made to the following description and accompanying drawings, wherein:

FIG. 1 is a fragmentary perspective view of an independent front suspension system embodying the invention.

FIG. 2 is an enlarged fragmentary perspective view of a portion of the FIG. 1 structure.

FIG. 3 is an enlarged perspective view of a component of the FIG. 2 structure, and FIG. 4 is an alternate embodiment, similar to FIG. 3.

Referring now to the drawings in greater detail, FIG. 1 illustrates a conventional independent front suspension system 10 operatively connected between a vehicular frame 12 and a steerable road wheel 14. The suspension system 10 typically includes lower and upper wishbone or "Y" shaped control arms 16 and 18, respectively, each pivotally connected at the inner ends to the frame 12 and at the outer ends to a steering knuckle or wheel carrier 20 on which the wheel 14 is rotatably mounted. A coil spring 22 and a shock absorber 23 are mounted between the frame 12 and a central seat 24 and a rear side surface (not shown), respectively, of the lower control arm 16.

As may be noted in FIG. 2, the inner ends of the lower control arm 16 are elastically and pivotally supported on the end portins of a control arm shaft 28 by an elastomeric bushing 25 mounted within a metal spacer sleeve 26. A pair of mounting brackets or clamps 30 located adjacent the respective pivotal connections of the ends of the lower control arm 16 and the shaft 28 serve to secure the shaft 28 to the frame 12. As may be noted in Matthews, U.S. Pat. No. 2,171,157, mounting brackets or clamps have typically connected control arm shafts, such as the shaft 28, to the frame in a rigid manner. It is a feature of this invention to use clamps 30 which have enlarged bores 32 formed therethrough such that elastomeric bushings 34 having a shape to be described may be mounted between the shaft 28 and the respective clamps 30. Suitable fasteners, such as bolts 35, secure the clamps 30 to the frame 12.

As better noted in FIG. 3, at least one and, preferably, oppositely disposed flat sides 36 are formed on each of the elastomeric bushings 34, thus providing a reduced effective thickness of the bushings 34, and an adjacent void or space between the bushing and the inner wall of the clamp 30, in the horizontal plane. The thinner elastomeric horizontal sections provide a low horizontal rate, as compared to the relatively higher vertical rate due to the thicker top and bottom sections of the bushing 34, for increased horizontal movement and minimal vertical movement of the wheel 14 and the control arm 16 relative to the movement of the frame 12 during road impact conditions.

More specifically, during uneven road load conditions, the impact force on the lower control arm 16 has both vertical and horizontal vectors, the reaction to contact of the tire against an uneven road surface urging the lower control arm 16 to horizontally pivot about the compliance center between the clamps 30, as well as to move axially with respect to the axis of the shaft 28. With the above described thinnest and, hence, softest sections of the elastomeric bushings 34 facing toward and/or away from the wheel 14, the resultant horizontal movement is large, by virtue of the shaft 28 forcing the thin wall into the void or space between each bushing 34 and the adjacent wall of the clamp 30, as compared to a direct securing of the shaft 28 to the frame 12, thereby greatly reducing the impact feel through the frame 12 and the vehicle body to the operator. Vertical travel of the tire and wheel 14 is absorbed by the coil spring 22 and the shock absorber 23. The high compression rate of the elastomeric bushing 34 maintains the spatial relationship between the control arm shaft 28 and the frame 12.

As an alternate embodiment, the elastomeric bushing 38 shown in FIG. 4 includes a cut-out or window portion 40 formed in the oppositely disposed alternate walls thereof. The interconnecting webs 42 may be eliminated entirely, but, preferably, are included merely to maintain a predetermined spatial relationship between the upper and lower sections of the bushing 38, and are maintained as narrow as possible to accommodate the above described preferred low horizontal rate.

It is apparent that the invention provides a relatively simple elastomeric addition to an otherwise conventional independent front suspension system for effectively isolating the frame from road impact conditions.

It is also apparent that, for particular vehicular applications, the elastomeric bushings 34 or 38 could be adapted to the upper control arm 18, as well as to the lower control arm 16.

While but two embodiments of the invention have been shown and described, other modifications thereof are possible.

What is claimed is:

1. In combination with a vehicle frame, an independently sprung front wheel assembly including a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm for pivotal movement about said shaft; mounting means having a bore formed therethrough a predetermined diameter larger than the diameter of said shaft and surrounding said shaft intermediate said inner ends of said control arm; fastener means for rigidly securing said mounting means to said frame; and elastomeric bushings mounted on said shaft and confined in the bore of said mounting means, said elastomeric bushings having at least one side of reduced effective thickness forming a space providing a low horizontal rate and a high vertical rate for increased horizontal movement and minimal vertical movement of said wheel and said control arm relative to said frame during road impact conditions, thereby substantially isolating said frame from such impacts.

2. In combination with a vehicle frame, an independently sprung front wheel assembly including a wishbone-shaped lower control arm; a steering knuckle and associated road wheel mounted on the outer end of said lower control arm; a vertically oriented coil spring disposed between said lower control arm and said frame; a horizontally oriented shaft; means connecting the inner ends of said wishbone-shaped control arm to the ends of said shaft for pivotal movement about said shaft; a pair of clamp members having bores formed therethrough a predetermined diameter larger than the diameter of said shaft and surrounding said shaft intermediate the respective ends thereof; fastener means for rigidly securing said clamp members to said frame; and elastomeric bushings having oppositely disposed substantially vertically oriented flat sides formed thereon, said elastomeric bushings being mounted on said shaft and confined in the respective bores of said clamp members with one flat surface facing said road wheel for providing low horizontal rate and high vertical rate for increased horizontal movement and minimal vertical movement of said wheel and said lower control arm relative to said frame during road impact conditions, thereby substantially isolating said frame from such impacts.

3. In combination with a vehicle frame, an independently sprung front wheel assembly including a wishbone-shaped control arm; a steering knuckle and associated road wheel mounted on the outer end of said control arm; a vertically oriented coil spring disposed between said control arm and said frame; a horizontally oriented shaft pivotally connected at the ends thereof to the respective inner ends of said control arm; a pair of clamp members having bores formed therethrough a predetermined diameter larger than the diameter of said shaft and surrounding said shaft intermediate the respective ends thereof; fastener means for rigidly securing said clamp members to said frame; and elastomeric bushings having windows formed in oppositely disposed substantially vertically oriented sides thereof, said elastomeric bushings being mounted on said shaft and confined in the respective bores of said clamp members, providing low horizontal rate and high vertical rate for increased horizontal movement and minimal vertical movement of said wheel and said control arm relative to said frame during road impact conditions, thereby substantially isolating said frame from such impacts.

4. In combination with a vehicle frame, an independently sprung front wheel assembly including a wishbone-shaped control arm having an outer end and a pair of spaced apart inner ends; a steering knuckle and associated road wheel mounted on said outer end of said control arm; a vertically oriented coil spring disposed between said control arm and said frame; a horizontally oriented shaft adapted to having said inner ends of said control arm mounted for pivotal movement adjacent the ends thereof; a pair of clamp members having bores formed therethrough a predetermined diameter larger than the diameter of said shaft and surrounding said shaft intermediate the respective ends thereof adjacent said inner ends of said control arm; fastener means for rigidly securing said clamp members to said frame; and elastomeric bushings including top and bottom arcuate sections and oppositely disposed contoured outer side surfaces providing sections of reduced effective thicknesses, said elastomeric bushings being mounted on said shaft and confined in the respective bores of said clamp members, providing low horizontal rate and high vertical rate for increased horizontal movement and minimal vertical movement of said wheel and said control arm relative to said frame during road impact conditions, thereby substantially isolating said frame from such impacts.

* * * * *